United States Patent
Petschke et al.

(10) Patent No.: US 6,635,706 B1
(45) Date of Patent: Oct. 21, 2003

(54) URETHANE-ACRYLIC HYBRID POLYMER DISPERSION

(75) Inventors: Glenn Petschke, Raleigh, NC (US); Shi Yang, Cary, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 0 days.

(21) Appl. No.: 09/337,949

(22) Filed: Jun. 23, 1999

(51) Int. Cl.[7] .............................. C08J 3/00; C08K 3/20; C08L 75/00; C08F 8/30; C08F 283/04
(52) U.S. Cl. ..................... 524/589; 524/507; 524/590; 524/591; 524/839; 524/840; 525/123; 525/455; 525/920
(58) Field of Search ................................ 524/507, 591, 524/839, 840, 589, 590; 525/123, 455, 920

(56) References Cited

U.S. PATENT DOCUMENTS

| 3,684,759 | A | 8/1972 | Reiff et al. | 260/29.6 NR |
|---|---|---|---|---|
| 4,066,591 | A | 1/1978 | Scriven et al. | 260/29.2 TN |
| 4,147,679 | A | 4/1979 | Scriven et al. | 260/29.2 TN |
| 4,277,380 | A | 7/1981 | Williams et al. | 260/18 TN |
| 4,310,449 | A | 1/1982 | Reischl | 260/29.6 NR |
| 4,318,833 | A | 3/1982 | Guagliardo | 524/457 |
| 4,408,008 | A | 10/1983 | Markusch | 524/591 |
| 4,499,233 | A | 2/1985 | Tetenbaum et al. | 524/591 |
| 4,507,431 | A | 3/1985 | Stutz et al. | 524/840 |
| 4,528,363 | A | 7/1985 | Tominaga | 528/370 |
| 4,554,308 | A | 11/1985 | Russiello | 524/591 |
| 4,644,030 | A | 2/1987 | Loewrigkeit et al. | 524/457 |
| 4,730,021 | A | 3/1988 | Zom et al. | 524/457 |
| 4,745,151 | A | 5/1988 | Noll et al. | 524/591 |
| 4,764,553 | A | 8/1988 | Mosbach et al. | 524/591 |
| 4,806,611 | A | 2/1989 | Hönel et al. | 528/45 |
| 4,808,658 | A | 2/1989 | Walz et al. | 524/591 |
| 4,920,172 | A | 4/1990 | Daoud | 524/502 |
| 4,927,876 | A | 5/1990 | Coogan et al. | 524/457 |
| 5,034,435 | A | 7/1991 | Squiller et al. | 523/415 |
| 5,104,928 | A | 4/1992 | Craun et al. | 524/773 |
| 5,116,901 | A | 5/1992 | Biale | 524/457 |
| 5,137,961 | A | 8/1992 | Goos et al. | 524/457 |
| 5,141,983 | A | 8/1992 | Hasegawa et al. | 524/457 |
| 5,169,719 | A | 12/1992 | Balatan | 428/423.1 |
| 5,169,895 | A | 12/1992 | Coogan et al. | 524/591 |
| 5,173,526 | A | 12/1992 | Vijayendran et al. | 524/457 |
| 5,229,433 | A | 7/1993 | Schunck et al. | 522/96 |
| 5,242,716 | A | 9/1993 | Iwase et al. | 427/407.1 |
| 5,371,133 | A | 12/1994 | Stanley | 524/457 |
| 5,494,980 | A | 2/1996 | Buter et al. | 525/455 |
| 5,521,246 | A | 5/1996 | Tien et al. | 524/507 |
| 5,571,857 | A | 11/1996 | Gruber et al. | 524/457 |
| 5,594,065 | A | 1/1997 | Tien et al. | 524/507 |
| 5,652,291 | A | 7/1997 | Oshita et al. | 524/457 |
| 5,691,425 | A | 11/1997 | Klein et al. | 525/455 |
| 5,719,227 | A | 2/1998 | Rosenberry et al. | 524/590 |

Primary Examiner—Patrick D. Niland
(74) Attorney, Agent, or Firm—Myers Bigel Sibley & Sajovec, PA

(57) ABSTRACT

A precrosslinked, urethane-acrylic dispersion formed from an isocyanate terminated urethane prepolymer reacted with mono-functional active hydrogen containing vinyl monomer and vinyl monomers inert to isocyanate functionality. To this polyurethane prepolymer having 0 to 100 percent vinyl termination—vinyl monomer blend is added a polyisocyanate having an average isocyanate functionality of less than 4 such that 0.5 to 20 percent of the urethane solids of the blend are polyisocyanate. The mixture containing less than 3 percent NCO groups, on solids, is dispersed into water and any residual isocyanate groups chain extended with one or more active hydrogen containing compounds. Optionally, the polyisocyanate can be added directly into the dispersion once the polyurethane prepolymer and the vinyl monomer blend is dispersed. The vinyl monomers are then reacted by free radical polymerization.

23 Claims, No Drawings

URETHANE-ACRYLIC HYBRID POLYMER DISPERSION

BACKGROUND OF THE INVENTION

This invention relates to polyurethane polymers, particularly urethane-acrylic hybrid polymer dispersions, and more particularly, crosslinked urethane-acrylic hybrid polymer dispersions, prepared from polyisocyanates.

It is known in the coating industry that polyurethane coatings exhibit excellent resistance to abrasion, chemicals and solvents, and are highly flexible and durable. Conventional solvent-borne urethanes often contain high levels of volatile organic compounds or VOC's. Water-borne urethanes or polyurethane dispersions (PUD) have been used as architectural VOC compliant alternatives to conventional solvent-borne urethane coatings for many years due to their environment advantages. In most architectural coating applications, acrylic latex is used to blend with these PUD's for economy. However, there is some compromise in performance by blending, particularly chemical resistance and the balance of film flexibility and hardness. The urethane-acrylic hybrids of this invention overcome these drawbacks due to their core-shell particle morphology.

Generally, most waterborne urethanes and urethane-acrylic hybrids are linear in structure. When applied as a coating, the water and cosolvent evaporate and a thermoplastic polymer film forms. This thermoplastic film is deficient in chemical resistance compared to a thermosetting polyurethane film due to the fact the linear thermoplastic film can be re-dissolved.

U.S. Pat. No. 4,408,008 to Markusch discloses that a stable aqueous dispersion of crosslinked urea-urethane polymers can be prepared by using polyfunctional amine chain extenders having an average functionality between 2.2 to 6.0 to extend the isocyanate-terminated urethane prepolymer.

U.S. Pat. Nos. 4,554,308 to Russiello and U.S. Pat. No. 4,745,151 to Noll et al propose methods to make stable pre-crosslinked polyurethane dispersions by dispersing a branch prepolymer solution made by reacting a mixture of polyfunctional hydrogen compounds with di- or polyfunctional isocyanate, and then dispersing and chain extending the prepolymer with di- or multi-functional amine.

U.S. Pat. No. 4,147,679 to Scriven suggests that the branched isocyanate-terminated prepolymer can also be prepared by using tris-(hydroxyethyl) isocyanurate as part of polyfunctional hydrogen compound. Russiello, Noll and Scriven are similar in that they all suggest a pre-crosslinked polyurethane dispersion can be prepared by chain extending a branched isocyanate-terminated prepolymer. A major problem with this approach is that branched prepolymers typically are much more viscous than linear prepolymers, therefore, they require significantly more solvent to achieve a manageable viscosity.

As mentioned above, water-borne polyurethane polymers are for the most part linear, producing films with poorer chemical resistance than the highly crosslinked films of two component solvent-borne urethane systems. Pre-crosslinking of the water-borne polyurethane polymers by incorporation of a significant amount of monomer(s) having functionalities greater than two in the prepolymer stage results in highly viscous prepolymers that typically cannot be dispersed. Sufficient pre-crosslinking of the prepolymer in the dispersion stage by means of chain extenders having functionalities greater than two can result in significant polymer gel.

The problem of highly viscous branched prepolymers or polymer gel due to highly functional chain extenders is addressed in U.S. Pat. No. 4,507,431 to Stutz. Therein it is proposed that crosslinked polyurethane ionomer dispersions be prepared by a method in which polyurethane prepolymers having an isocyanate group content of 0.1 to 2 percent by weight are mixed with polyisocyanates. After chain extension of the isocyanate-terminated prepolymer and polyisocyanate mixture by diamine, a pre-crosslinked polyurethane-urea is obtained. Since the polyisocyanates are mixed with the prepolymer just before or after dispersion, the problem of high viscosity prepolymer is overcome. These dispersions do not contain any acrylic polymer and are relatively expensive, for example, for architectural applications.

It is so proposed in U.S. Pat. No. 5,169,895 to Coogen et al. (1992) that a crosslinked aqueous polyurethane dispersion can be prepared in a low boiling point organic solvent by mixing a polyurethane prepolymer, having an isocyanate group content 2.1 to 10 percent by weight, with an organic polyisocyanate. This prepolymer-polyisocyanate is then dispersed and chain extended. The organic polyisocyanate has an average isocyanate functionality of 2.1 to 4.0. These dispersions do not contain any acrylic polymer and are relatively expensive for architectural applications.

Blending of acrylic emulsions with water-borne polyurethanes has been used as a means to reduce coating costs, however, as previously mentioned there is some compromise in performance such as, chemical resistance.

U.S. Pat. No. 4,644,030 to Loewrigkeit et al. proposes that non-crosslinked polyurethane-acrylic hybrid dispersions can be prepared by producing an NCO terminated carboxylic acid functional prepolymer in the presence of inert liquid vinyl monomer(s). The carboxylic acid group of the prepolymer is neutralized with a volatile amine and the blend dispersed into water. This neutralized, dispersed NCO terminated prepolymer is then chain extended with one or more active hydrogen containing compounds such as polyamines, hydrazine and hydrazides. This dispersion consisting of polyurethane polymer and vinyl monomer(s) is then subjected to free radical polymerization. While dispersions of this type may be essentially free of any cosolvent and emulsifier and lower in raw material costs compared to pure polyurethane dispersions, the polymer is essentially linear and, thus, does not provide sufficient chemical resistance in the absence of any second component crosslinking agents.

U.S. Pat. No. 5,571,857 to Gruber et al. proposes that solvent free urethane-acrylic hybrid polymers can be made by reaction of an excess of isophorone diisocyanate with polyol(s) and dihydroxy carboxylic acid. The resulting NCO terminated carboxylic acid functional prepolymer is blended with vinyl monomer(s) to reduce the viscosity. A tertiary amine is then added to neutralize the acid groups and the blend is dispersed into water. The NCO terminated urethane prepolymer is then chain extended with a blend of mono and diamines followed by free radical polymerization of the vinyl monomer(s). As with Loewrigkeit, these polymers are essentially linear. These dispersions are solvent and emulsifier free, however, in the absence of a second component, the film's chemical resistance is insufficient for coatings applications.

U.S. Pat. No. 5,104,928 to Craun et al. proposes that thermosetting urethane-acrylic hybrid dispersions can be prepared by using carbodiimide crosslinkers. The polymeric carbodiimide is added into the carboxyl-functional polyurethane dispersion after prepolymer chain extension. The polymeric carbodiimide reacts with carboxyl acid groups to form a crosslinking polyurethane.

It is proposed in U.S. Pat. No. 5,521,246 to Tien et al. that a room temperature self-crosslinkable polyurethane-acrylic hybrid dispersion can be prepared by first producing an NCO-terminated carboxyl functional polyurethane prepolymer. Vinyl monomers a portion of which is glycidyl methacrylate are added, the carboxyl groups neutralized with a tertiary amine, the mixture dispersed into water, an oil-soluble free radical initiator added, polymerizing the vinyl monomers and chain extending the urethane with water. Since the epoxy group is hydrophilic and reaction catalyzed by the presence of tertiary amines, the stability of these dispersions is questionable particularly, at elevated temperatures.

SUMMARY OF THE INVENTION

It is an object of the present invention to provide a stable, pre-crosslinked, urethane-acrylic hybrid polymer dispersion.

It is another object of the present invention to provide a stable, pre-crosslinked urethane acrylic hybrid polymer dispersion that produces films that dry rapidly at room temperature and are permanently crosslinked.

It is still another object of the present invention to provide a stable, pre-crosslinked, urethane acrylic hybrid polymer dispersion that is resistant to abrasions, chemicals and stains.

In one embodiment, the pre-crosslinked urethane-acrylic hybrid dispersion is prepared from an isocyanate terminated prepolymer. The isocyanate terminated prepolymer is preferably the reaction product of monomeric diisocyanate and active hydrogen containing materials preferably having from 1.8 to 3.0 active hydrogens per molecule and preferably having a molecule weight of 62 to 5000. To this isocyanate terminated prepolymer is added one or more vinyl monomers, a portion of which is mono-functional active hydrogen containing vinyl monomer sufficient to react with 0 to 100 percent of the isocyanate groups of the isocyanate terminated prepolymer. If the polyurethane prepolymer having 0 to 100 percent vinyl termination also contains carboxylic acid functionality, a tertiary amine is added to neutralize and form salt groups. To this polyurethane prepolymer having 0 to 100 percent vinyl termination—vinyl monomer blend is added a polyisocyanate having an average isocyanate functionality of less than 4 such that 0.5 to 20 percent of the urethane solids of the blend are polyisocyanate. If salt groups are required for dispersion, the appropriate counter ion is added. This polyurethane prepolymer having 0 to 100 percent vinyl termination—vinyl monomer—polyisocyanate blend having an NCO content of 3.0 percent or less is then dispersed into water and any residual isocyanate groups chain extended with one or more active hydrogen containing compounds. The vinyl groups are then reacted by free radical polymerization. The resulting urethane-acrylic hybrid contains from 20 to 80 percent by weight polyurethane, based on solids.

In another embodiment, the pre-crosslinked urethane-acrylic hybrid dispersion, is prepared from an isocyanate terminated prepolymer. The isocyanate terminated prepolymer is the reaction product of monomeric diisocyanate and active hydrogen containing materials preferably having from 1.8 to 3.0 active hydrogens per molecule and preferably having a molecule weight of 62 to 5000. To this isocyanate terminated prepolymer is added one or more vinyl monomers, a portion of the vinyl monomer maybe mono-functional active hydrogen containing vinyl monomer sufficient to react with 0 to 100 percent of the isocyanate groups of the isocyanate terminated prepolymer. If salt groups are required to disperse the appropriate counter ion is added. This polyurethane prepolymer having 0 to 100 percent vinyl termination—vinyl monomer blend having an NCO content of less than 3.0 percent is then dispersed into water. A polyisocyanate having an average isocyanate functionality of less than 4 is then added such that 0.5 to 20 percent of the urethane solids in the dispersion are polyisocyanate. The vinyl groups are then reacted by free radical polymerization. The resulting urethane-acrylic hybrid contains from 20 to 80 percent by weight polyurethane based on solids.

DETAILED DESCRIPTION OF THE INVENTION

As summarized above, the present invention provides a stable, pre-crosslinked, urethane-acrylic hybrid polymer dispersion. An isocyanate terminated urethane prepolymer is blended with vinyl monomers, a portion of which maybe mono-functional active hydrogen containing vinyl monomer sufficient to react with 0 to 100 percent of the isocyanate groups of the isocyanate terminated prepolymer. If salt groups are required for dispersion, the appropriate counter ion is added. To this polyurethane prepolymer having 0 to 100 percent vinyl termination is added a polyisocyanate having an average isocyanate functionality of less than 4 such that 0.5 to 20 percent of the urethane solids are polyisocyanate. The blend of polyurethane prepolymer having 0 to 100 percent vinyl termination—vinyl monomer—polyisocyanate is than dispersed into water. Any remaining isocyanate groups are chain extended with one or more active hydrogen containing compounds. The vinyl monomers are then subject to free radical polymerization. Optionally, the polyisocyanate portion can be post added directly to the dispersion once the polyurethane prepolymer having 0 to 100 percent vinyl termination—vinyl monomer blend is dispersed.

The isocyanate terminated prepolymer preferably is the reaction product of a monomeric diisocyanate and active hydrogen containing compounds having from 1.8 to 3.0 active hydrogens per molecule and a molecular weight of 62 to 5000. A portion of the active hydrogen containing material can be monomeric polyhydroxy functional polyols such as ethylene, propylene, butylene glycols, neopentyl glycol, 1,4-cylcohexane dimethanol, trimethylol ethane, triemthylol propane and hydroxy functional polyester, polyethers based on polyethylene oxide or polypropylene oxide or tetrahydrofuran and polycarbonates.

A portion of the active hydrogen containing material can also contain some hydrophilic functional groups which when neutralized with the appropriate counter ion form anionic or cationic salt groups, or non-ionic hydrophilic functional groups or both and may or may not be chemically bonded to the prepolymer. Suitable compounds having active hydrogen and active acid groups include hydroxy and mercapto carboxylic acids, aminocarboxylic acids, aminohydroxy carboxylic acids, sulfonic acids, hydroxy sulfonic acids and aminosulfonic acids. Suitable neutralizing bases include inorganic bases such as sodium hydroxide, potassium hydroxide, lithium hydroxide, ammonia, triethylamine and dimethyl ethanol amine. Suitable compounds having active hydrogen groups and active basic groups include aliphatic, cycloaliphatic and hetercyclic amino alcohols, diols and triols; amines, diamines, triamines, tetramines and amides. Suitable neutralizing acids include organic acids such as formic acid and acetic acid, and inorganic acids such as hydrochloric acid and sulfuric acid.

The term "active hydrogen containing compound" relates to a compound having hydrogens that, because of their position in the molecule, display activity according to the Zerewitinoff test. Active hydrogen include hydrogen atoms attached to oxygen, nitrogen, or sulfur, and thus useful compounds will include those having at least two of these groups (in any combination) —OH, —SH, and —NH —. The moieties attached to each group can be aliphatic, aromatic, cycloaliphatic or of a mixed type not including carbonyl, phosphonyl or sulfonyl linkages such as described in U.S. Pat. No. 4,147,679 to Scriven et al. the disclosure of which is incorporated herein by reference in its entirety. Suitable compounds include aliphatic, cycloaliphatic and heterocyclic amino alcohols, polyamines, hydrazine, substituted hydrazines, hydrazides, amides, water and mixtures thereof.

Particularly suitable organic diisocyanates for forming the polyurethane prepolymer include 1,4-tetramethylene diisocyanate, 1,6-hexamethylene diisocyanate, 2,2,4-trimethyl-1,6-dissocyanatohexane, 1,10-decamethylene diisocyanate, 1,4-cyclohexylene diisocyanate, bis(4-isocyanatocyclohexyl)methane, 1-isocyanato-3-isocyanatomethyl-3,5,5-trimethyl-cyclohexane, m- and p-phenylene dissocyanate, 2,6- and 2,4-tolylene diisocyanate, xylene diisocyanate, 4-chloro-1,3-phenylene diisocyanate, 4,4'-biphenylene disocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

The isocyanate terminated prepolymer can contain from 0 to 30 percent by weight of a water miscible or partially miscible solvent. Suitable solvents include 5 to 30 percent by weight of esters, glycol ether esters, ketones, substituted amides or N-methyl pyrrolidinone.

The polyisocyanate component has an average isocyanate functionality of less than 4, and preferable an average isocyanate functionality of from 2.5 to 3. The polyisocyanate is selected from the group consisting of biurets, isocyanurates and allophonates of hexamethylene diisocyanate. Preferably 0.5 to 20 percent of the urethane solids, and more preferably 1 to 10 percent of the solids are polyisocyanate. Vinyl monomers that are inert to isocyanate functionality include acrylic acid, methacrylic acid, ethyl acrylate, butyl acrylate, methyl methacrylate, ethyl methacrylate, butyl methacrylate, acrylamide, methylacrylamide, styrene and vinyl toluene. Mono-functional active hydrogen containing vinyl monomers include hydroxy ethyl acrylate, hydroxy propyl acrylate, hydroxy ethyl methacrylate, hydroxy propyl methacrylate and the like.

Suitable active hydrogen containing compounds added to react with residual isocyanate groups for chain extension include aliphatic, aromatic, cycloaliphatic and hetercyclic amino alcohols, polyamines, hydrazine, substituted hydrazines, hydrazides, amides, water and mixtures thereof.

Free radical polymerization of the vinyl groups is achieved by addition of a suitable catalyst, preferably utilizing the addition of an azo compound.

The dispersion may also contain other ingredients such as plasticizers, pigments, colorants, dyes, surfactants, thickeners, heat stabilizers, leveling agents, anti-cratering agents, fillers, sedimentation inhibitors, ultraviolet-light absorbers, and the like to modify properties. Additives such as promoters, heat stabilizers, ultraviolet-light absorbers, etc., can be intimately dispersed in the reaction mixture and apparently thereby become an integral part of the urethane polymer. Alternatively, the additive may be introduced after the urethane polymer has been formed, in which case the additives can be incorporated on the surface of the polymer or dispersed in the aqueous medium.

The resulting urethane coating composition is air dryable, has a high hardness and is resistant to abrasions, chemicals, and stains.

EXAMPLES

The following examples illustrate specific embodiments of the present invention. In the examples and throughout the specification, all parts and percentages are by weight, unless otherwise indicated.

Example 1

Pre-crosslinking

Into a clean dry flask equipped with an agitator, thermometer, nitrogen inlet and outlet tubes is charged 210 parts of a hexane diol—isophthalic acid—adipic acid polyester polyol (2000 MW), 41 parts of dimethylol propionic acid, 175 parts of N-methyl pyrrolidinone cosolvent and 134.6 parts of bis (4-isocyanatocyclohexyl) methane. The ingredients are stirred and heated slowly to 95° C. under a dry nitrogen atmosphere and then maintained at this temperature until the prepolymer NCO content reaches the theoretical value (1.54 percent). The prepolymer is then cooled to 80° C. and a mixture of 107 parts of butyl acrylate and 556 parts of methyl methacrylate are added into the prepolymer. The prepolymer temperature is adjusted to 50–55° C. and 30.3 parts of triethylamine and 40 parts of an hexamethylene diisocyanate based isocyanurate were then added (NCO content is 1.3 percent). The mixture is stirred for 10 minutes then 1200 parts of this mixture are dispersed into 1050 parts of water under agitation. To this NCO containing dispersion is added a solution consisting of 90 parts of water, 14 parts of hydrazine (35 percent) and 1.2 parts of diethylene triamine resulting in a stable dispersion.

The above dispersion is heated to about 75° C. under a nitrogen atmosphere, and a mixture of 0.4 parts of Vazo-52 in 6 parts of Dowanol DPM is added dropwise into this dispersion over a period of 60 minutes while maintaining the temperature at 78–82 C. Once half of this initiator solution is added, a mixture of 0.25 parts of ammonium persulfate (APS) in 3 parts of water is added into the dispersion through a separate dropping funnel over a period of 30 minutes. Once the addition is complete, the dispersion is cooled to 60° C. and mixtures of 0.3 parts of tertiary butyl hydroperoxide (TBHP) in 1 part water and 0.25 parts of cumene hydroperoxide in 1 part of water are added into the dispersion. After holding the dispersion for 5 minutes at 60° C., a mixture of 0.3 parts of hydrosulfite (AWC) in 3 parts of water is added into the dispersion to increase the monomer conversion. The final dispersion has a non-volatile content of 43 percent, pH of 7.51 and viscosity of 540 cps.

Example 2

No Pre-crosslinking

A urethane-acrylic hybrid similar to that of the previous example is prepared with the exception that no isocyanurate of hexamethylene diisocyanate is used. The final dispersion has a non-volatile content of 43.8 percent, pH of 7.51 and viscosity of 131 cps. For comparison, this material is used as control sample for comparing the chemical resistance with the pre-crosslinking hybrid. The results are shown in the following table.

|  | Pre-cross-linked Example 1 | No Crosslinking Example 2 | PUD | PUD/Acrylic 50/50 |
|---|---|---|---|---|
| Precrosslinking | Yes | No | Yes | Yes |
| Acrylic Tg, C | ~80 | ~80 | — | ~80 |
| Chemical Resistance[1] | | | | |
| Black marker | 3 | 3 | 3 | 2 |
| Ball point ink | 2 | 2 | 2 | 2 |
| Iodine solution | 2 | 2 | 3 | 1 |
| Lip stick | 4 | 2 | 3 | 3 |
| Shoe polish | 3 | 2 | 4 | 3 |
| Merthiolate | 2 | 2 | 3 | 2 |
| Dye | 3 | 2 | 4 | 4 |
| Coffee | 4 | 3 | 3 | 2 |
| Tea | 4 | 4 | 2 | 2 |
| Water | 5 | 4 | 2 | 2 |
| Mustard | 4 | 3 | 3 | 2 |
| Ketchup | 4 | 5 | 4 | 2 |
| Nail polish | 3 | 3 | 3 | 3 |
| Polish remover | 4 | 3 | 5 | 4 |
| 50 percent EtOH | 4 | 3 | 4 | 2 |
| 10 percent Acetic acid | 2 | 1 | 2 | 1 |
| 2 percent Nitric acid | 5 | 3 | 2 | 1 |
| 10 percent Sulfuric acid | 5 | 2 | 5 | 2 |
| 10 percent NaOH | 1 | 2 | 5 | 1 |
| 409 ® Cleaner | 5 | 3 | 3 | 3 |
| Windex ® | 5 | 4 | 2 | 2 |
| 10 percent Ammonia | 4 | 3 | 3 | 3 |
| Total | 78 | 63 | 70 | 49 |
| Average | 3.55 | 2.86 | 3.18 | 2.23 |
| Impact Resistance, in-lbs | | | | |
| Direct | 160 | 160 | 160 | 10 |
| Reverse | 160 | 160 | 160 | >5 |

[1]Rating 0–5 no effect

Example 3

Polyisocyanate Addition to Dispersion

Into a clean dry flask equipped with an agitator, thermometer, nitrogen inlet and outlet tubes is charged 210 parts of hexane diol—isophthalic acid—adipic acid polyester polyol (2000 MW), 41 parts of dimethylol propionic acid, 165 parts of N-methyl pyrrolidinone cosolvent and 134.6 parts of bis (4-isocyanatocyclohexl) methane. The ingredients are stirred and heated slowly to 95° C. under a dry nitrogen atmosphere. When the temperature reaches to 95° C, 0.05 parts of T-12 catalyst is added. The temperature is held at 95° C. until the prepolymer NCO content reaches the theoretical value (1.57 percent). The prepolymer is then cooled to 80° C. and a mixture of 180 parts of butyl acrylate, 515 parts of methyl methacrylate and 80 parts of styrene are added into the prepolymer. The prepolymer temperature is adjusted to 50–55° C. and 30.3 parts of triethylamine is then added. The mixture is stirred for 15 minutes then 1300 parts of this mixture are dispersed into 1050 parts of water in under agitation. After dispersing this linear prepolymer into water, 28.76 parts of hexamethylene diisocyanate based isocyanurate is added into the dispersion. To this NCO-terminated prepolymer and isocyanurate mixture dispersion is added a chain extender solution consisting of 120 parts of water, 10.6 parts of hydrazine (35 percent) and 1.32 parts of diethylene triamine resulting in a stable dispersion.

The above dispersion is heated to about 78° C. under a nitrogen atmosphere, and a mixture of 0.4 parts of Vazo-52 in 4 parts of Dowanol DPM is added dropwise into this dispersion over a period of 60 minutes while maintaining the temperature at 78–82 C. Once half of this initiator solution is added, a mixture of 0.2 parts of ammonium persulfate (APS) in 3 parts of water is added into the dispersion through a separate dropping funnel over a period of 30 minutes. Once the addition is complete, the dispersion is cooled to 70° C. and mixtures of 0.2 parts of tertiary butyl hydroperoxide (TBHP) and 0.2 parts of cumene hydroperoxide in 1 part of water are added into the dispersion. After holding the dispersion for 5 minutes at 70° C., a mixture of 0.2 parts of hydrosulfite (AWC) in 2 parts of water is added into the dispersion to increase the monomer conversion. The final dispersion has a non-volatile content of 45 percent, pH of 7.77 and viscosity of 425 cps.

Example 4

Precrosslinking With Isocyanurate and Triacrylate

Into a clean dry flask equipped within agitator, thermometer, nitrogen inlet and outlet tubes is charged 210 parts of hexane diol—isophthalic acid—adipic acid polyester polyol (2000 MW), 41 parts of dimethylol propionic acid, 175 parts of N-methyl pyrrolidinone cosolvent and 134.6 parts of bis (4-isocyanatocyclohexyl) methane. The ingredients are stirred and heated slowly to 90° C. under a dry nitrogen atmosphere and maintained at this temperature for 2 hours. The reaction temperature is then increased to 95° C. and 0.05 parts of dibutyl tin dilaurate catalyst is added. The temperature is held at 95° C. until the prepolymer NCO content reaches the theoretical value (1.54 percent). The prepolymer is then cooled to 80° C. and a mixture of 108 parts of butyl acrylate, 530 parts of methyl methacrylate and 13 parts of trimethylolpropane triacrylate (TMPTA) are added into the prepolymer. The prepolymer temperature is adjusted to 50–55° C. and 30.3 parts of triethylamine and 40 parts of hexamethylene diisocyanate based isocyanurate are then added (NCO content is 1.3 percent). The mixture is stirred for 10 minutes then 1270 parts of this mixture are dispersed into 1070 parts of water under agitation. To this NCO containing dispersion is added a solution consisting of 80 parts of water and 16.6 parts of hydrazine (35 percent) resulting in a stable dispersion.

To the above dispersion is added 40 parts of water and the dispersion is heated to about 75° C. under a nitrogen atmosphere. A mixture of 0.38 parts of Vazo-52 in 4 parts of Dowanol DPM is added dropwise into this dispersion over a period 90 minutes while maintaining the temperature at 75–85° C. Once one third of this initiator solution is added, a mixture of 0.39 parts of APS in 4 parts of water is added into the dispersion through a separate dropping funnel over a period of 30 minutes. Once the addition is complete, the dispersion is cooled to 70° C. and a mixture of 0.35 parts of tertiary butyl hydroperoxide (TBHP) and 0.35 parts of cumene hydroperoxide in 4 parts of water is added into the dispersion. After holding the dispersion for 10 minutes at 70° C., a mixture of 0.35 parts of hydrosulfite (AWC) in 3 parts of water is added dropwise into the dispersion over a period of 15 minutes to increase the monomer conversion. The final dispersion has a non-volatile content of 43 percent, pH of 7.46 and viscosity of 531 cps.

Example 5

Copolymer

Into a clean dry flask equipped with an agitator, thermometer, nitrogen inlet and outlet tubes is charged 240 parts of hexane diol—phthalic anhydride polyester polyol (2000 MW), 40 parts of dimethylol butanoic acid. With agitation, the mixture is heated to 135° C. under a dry nitrogen atmosphere then immediately cooled to 40° C. To this mixture is added 84.88 parts of toluene diisocyanate and reaction mixture slowly heated to 80° C. and held for 90 minutes. After 90 minutes at this temperature, 0.07 parts of methyl hydroquinone (MEHQ) and 350 parts of butyl acrylate are added into the prepolymer. The dry nitrogen blanket is stopped and dry air used to sparge the prepolymer. After the NCO content reaches the theoretical value (1.14 percent), 0.04 parts of dibutyl tin dilaruate catalyst and 34.2 parts of hydroxy ethyl acrylate are added into the prepolymer over a period of 30 minutes. 10 parts of hexamethylene diisocyanate based isocyanurate are then added. FTIR is used to confirm complete reaction of the isocyanate groups. To this vinyl group terminated urethane is added 250 parts of methyl methacrylate, and 15 parts of Igepal CO-630 (ethoxylated nonyl phenol. This blend is mixed for 15 minutes at 50° C. then 1000 parts dispersed into 960 parts of water under agitation.

A mixture of 0.66 parts of tertiary butyl hydroperoxide (TBHP) in 3 parts of water is added into the dispersion followed by a mixture of 0.35 parts of hydrosulfite (AWC) in 10 parts of water added dropwise over a period of 40 minutes while maintaining a temperature of 50–55° C. After holding the dispersion for an additional 45 minutes, mixtures of 0.4 parts of tertiary butyl hydroperoxide (TBHP) in 3 parts of water and 0.25 parts of hydrosulfite (AWC) in 10 parts of water are added into the dispersion. A mixture of 0.6 parts of cumene in 3 parts of water and 0.5 parts of Igepal CO-630 is added into the dispersion followed by a mixture of 0.3 parts of hydrosulfite (AWC) in 10 parts of water to increase the monomer conversion. Finally, 30 parts of water are added into the dispersion to adjust the viscosity. The final dispersion has a non-volatile content of 47 percent, pH of 7.85 and a viscosity of 2120 cps.

Example 6

Partial Copolymer

Into a clean dry flask equipped with an agitator, thermometer, nitrogen inlet and outlet tubes is charged 210 parts of hexane diol—isophthalic acid—adipic acid polyester polyol (2000 MW), 41 parts of dimethylol propionic acid, 170 parts of N-methyl pyrrolidinone cosolvent and 134.6 parts of bis (4-isocyanatocyclohexyl) methane. The ingredients are stirred and heated slowly to 95° C. under a dry nitrogen atmosphere and then maintained at this temperature for 3 hours and then 20.5 parts of hydroxy ethyl acrylate are added into the prepolymer to partially cap the prepolymer. The reaction is held at 95° C. until the prepolymer NCO content reaches to 0.28 percent (theoretical NCO content 0.21 percent). The prepolymer is then cooled to 80° C. and a mixture of 108 parts of butyl acrylate, 530 parts of methyl methacrylate and 13 parts of 1,4 butanediol diacrylate added to the prepolymer. The temperature is adjusted to 55° C. and 30.3 parts of triethylamine and 30 parts of hexamethylene diisocyanate based isocyanurate are added (NCO content 0.59 percent). The mixture is stirred for 10 minutes then 1200 parts of this mixture are dispersed into 1050 parts of water under agitation. To this NCO containing dispersion is added a solution consisting of 70 parts of water, 6.2 parts of hydrazine (35 percent) resulting in a stable dispersion.

The above dispersion is heated to about 75° C. under a nitrogen atmosphere, and a mixture of 0.4 parts of Vazo-52 in 5 parts of Dowanol DPM is added dropwise into this dispersion over a period of 60 minutes while maintaining the temperature at 78–82° C. Once half of this initiator solution is added, a mixture of 0.3 parts of ammonium persulfate (APS) in 3 parts of water is added into the dispersion through another dropping funnel over a period of 30 minutes. Once the addition is complete, the dispersion is cooled to 60° C. and a mixture of 0.3 parts of tertiary butyl hydroperoxide (TBHP) and 0.25 parts of cumene hydroperoxide in 1 part of water are added into the dispersion. After holding the dispersion for 5 minutes at 60° C., a mixture of 0.3 parts of hydrosulfite (AWC) in 3 parts of water is added into the dispersion to increase the monomer conversion. The final dispersion has a non-volatile content of 44 percent, pH of 7.41 and viscosity of 52 cps.

The present invention has been described in detail above. This invention may, however, be embodied in many different forms and should not be construed as limited to the embodiments set forth herein above; rather, these embodiments are provided so that this disclosure will be thorough and complete, and will fully convey the scope of the invention to those skilled in the art.

That which is claimed:

1. A stable precrosslinked, urethane-acrylic hybrid polymer dispersion formed by:
   (a) blending:
      (i) an isocyanate terminated urethane prepolymer which is the reaction product of monomeric diisocyanate and active hydrogen containing materials having from 1.8 to 3.0 active hydrogens per molecule and molecular weight of 62 to 5000, and having an NCO content of 1.0 to 1.9% by weight.
      (ii) a polyisocyanate equal to 0.5 to 20 % of the solids by weight of (i) and (ii) and having an average isocyanate functionality of less than 4.0, and
      (iii) one or more vinyl monomers inert to isocyanate functionality, and
   (b) reacting 0 to 100% of the isocyanate groups of the urethane prepolymer (i) and polyisocyanate (ii) in blend (a) with a monofunctional active hydrogen containing vinyl monomer, and
   (c) dispersing (b) into water,
   (d) chain extending residual isocyanate groups of the prepolymer with one or more active hydrogen containing compounds, and
   (e) reacting the vinyl groups of the blend by free radical polymerization.

2. The stable precrosslinked urethane-acrylic hybrid polymer dispersion according to claim 1, wherein the isocyanate monomer is selected from the group consisting of 1,4-tetramethylene diisocyanate, 1,6-hexamethylene diisocyanate, 2,2,4-trimethyl- 1,6-diissocyanatohexane, 1,10-decamethylene diisocyanate, 1,4-cyclohexylene diisocyanate, bis (4-isocyanatocyclohexyl) methane, 1-isocyanato-3-isocyanatomethyl-3,5,5-trimethylcyclohexane, m- and p-phenylene diisocyanate, 2,6- and 2,4-tolylene diisocyanate, xylene diisocyanate, 4-chloro-1, 3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

3. The stable precrosslinked urethane-acrylic hybrid polymer dispersion according to claim 1, wherein a portion of the active hydrogen containing material is selected from the group consisting of hydroxy functional polyester, polyethers based on polyethylene oxide, polpropylene oxide, tetrahydrofuran and polycarbonates.

4. The stable precrosslinked urethane-acrylic hybrid polymer dispersion according to claim 1, wherein a portion of the active hydrogen containing material contains hydrophilic functional groups.

5. The stable precrosslinked urethane-acrylic hybrid polymer dispersion according to claim 4, wherein the hydrophilic functional groups are anionic or cationic salt group or non-ionic hydrophilic functional groups which may or may not be chemically bonded to the prepolymer.

6. The stable precrosslinked urethane-acrylic hybrid polymer dispersion according to claim 1, wherein the isocyanate terminated prepolymer contains from 0 to 30% by weight of a water miscible or partially miscible solvent selected from the group consisting of esters, glycol ether esters, ketones, substituted amides or N-methyl pyrrolidinone.

7. The stable precrosslinked urethane-acrylic hybrid polymer dispersion according to claim 1, wherein the polyisocyanate component is selected from the group consisting of biurets, isocyanurates and allophonates of hexamethylene diisocyanate.

8. The stable precrosslinked urethane-acrylic hybrid polymer dispersion according to claim 1, wherein the monofunctional active hydrogen containing vinyl monomer is selected from the group consisting of hydroxy functional acrylates and methacrylates, amides, and amino functional acrylates and methacrylates.

9. The stable precrosslinked urethan—acrylic hybrid polymer dispersion according to claim 1, wherein the one or more vinyl monomers inert to isocyanate functionality is selected from the group consisting of acrylic acid, methacrylic acid, ethyl acrylate, butyl acrylate, methyl methacrylate, ethyl methacrylate, butyl methacrylate, acrylamide, methylacrylamide, styrene and vinyl toluene.

10. The stable, precrosslinked, urethane-acrylic hybrid polymer dispersion according to claim 1, wherein the active hydrogen containing compounds reacted with the prepolymer terminal isocyanate groups for chain extension are selected from the group consisting of aliphatic, cycloaliphatic and heterocyclic amino alcohols, polyamines, hydrazine, substituted hydrazines, hydrazides, amides, water and mixtures thereof.

11. The stable, precrosslinked, urethane-acrylic hybrid polymer dispersion according to claim 1, wherein reaction of the vinyl groups by free radical polymerization includes the addition of an azo compound.

12. A stable, precrosslinked urethane-acrylic hybrid polymer dispersion formed by:
  (a) blending:
    (i) an isocyanate terminated urethane prepolymer which is the reaction product of monomeric diisocyanate and active hydrogen containing materials having from 1.8 to 3.0 active hydrogens per molecule and a molecular weight of 62 to 5000, and having an NCO content of 1.0 to 1.9% by weight
    (ii) one or more vinyl monomers, inert to isocyanate functionality, and
  (b) reacting 0 to 100% of the isocyanate groups of the urethane prepolymer (i) in blend (a) with a monofunctional active hydrogen containing vinyl monomer
  (c) blending the reaction product of (b) with a polyisocyanate having an average isocyanate functionality of less than 4.0 and equal to 0.5 to 20% of the total weight of the solids of the polyurethane prepolymer (i) and polyisocyanate and
  (d) dispersing into water,
  (e) chain extending the residual isocyanate groups of the prepolymer with one or more active hydrogen containing compounds, and
  (f) reacting the vinyl groups of the blend by free radical polymerization.

13. The stable precrosslinked urethane-acrylic hybrid polymer dispersion according to claim 12, wherein the isocyanate monomer is selected from the group consisting of 1,4-tetramethylene diisocyanate, 1,6-hexamethylene diisocyanate, 2,2,4-trimethyl-1,6-diissocyanatohexane, 1,10-decamethylene diisocyanate, 1,4-cyclohexylene diisocyanate, bis (4-isocyanatocyclohexyl)methane, 1-isocyanato-3-isocyanatomethyl-3,5,5-trimethyl-cyclohexane, m- and p-phenylene diissocyanate, 2,6- and 2,4-tolylene diisocyanate, xylene diisocyanate, 4-chloro-1,3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

14. The stable precrosslinked urethane-acrylic hybrid polymer dispersion according to claim 12, wherein a portion of the active hydrogen containing material is selected from the group consisting of hydroxy functional polyester, polyethers based on polyethylene oxide, polpropylene oxide, tetrahydrofuran and polycarbonates.

15. The stable precrosslinked urethane-acrylic hybrid polymer dispersion according to claim 12, wherein a portion of the active hydrogen containing material also contains hydrophilic functional groups.

16. The stable precrosslinked urethane-acrylic hybrid polymer dispersion according to claim 15, wherein the hydrophilic functional groups are anionic or cationic salt groups or non-ionic hydrophilic functional groups which may or may not be chemically bonded to the prepolymer.

17. The stable precrosslinked urethane-acrylic hybrid polymer dispersion according to claim 12, wherein the isocyanate terminated prepolymer contains from 0–30% by weight of a water miscible or partially miscible solvent selected from the group consisting of esters, glycol ether esters, ketones, substituted amides and N-methyl pyrrolidinone.

18. The stable precrosslinked urethane-acrylic hybrid polymer dispersion according to claim 12, wherein the polyisocyanate component is selected from the group consisting of biurets, isocyanurates and allophonates of hexamethylene diisocyanate.

19. The stable precrosslinked urethane-acrylic hybrid polymer dispersion according to claim 12, wherein the mono-functional active hydrogen containing vinyl monomer is selected from the group consisting of hydroxy functional acrylates and methacrylates, amides, and amino functional acrylates and methacrylates.

20. The stable precrosslinked urethane-acrylic hybrid polymer dispersion according to claim 12, wherein the one or more vinyl monomers inert to isocyanate functionality is selected from the group consisting of acrylic acid, methacrylic acid, ethyl acrylate, butyl acrylate, methyl methacrylate, ethyl methacrylate, butyl methacrylate, acrylamide, methylacrylamide, styrene and vinyl toluene.

21. The stable, precrosslinked, urethane-acrylic hybrid polymer dispersion according to claim 12, wherein the active hydrogen containing compounds reacted with the prepolymer terminal isocyanate group for chain extension are selected from the group consisting of aliphatic, cycloaliphatic and heterocyclic amino alcohols, polyamines, hydrazine, substituted hydrazines, hydrazides, amides, water and mixtures thereof.

22. The stable, precrosslinked, urethane-acrylic hybrid polymer dispersion according to claim 12, wherein reaction of the vinyl groups by free radical polymerization includes the addition of an azo compound.

23. A stable precrosslinked, urethane-acrylic hybrid polymer dispersion formed by:
   (a) blending:
      (i) an isocyanate terminated urethane prepolymer which is the reaction product of monomeric diisocyanate and active hydrogen containing materials having from 1.8 to 3.0 active hydrogens per molecule and molecular weight of 62 to 5000, and having an NCO content of 1.0 to 1.9% by weight;
      (ii) a polyisocyanate equal to 0.5 to 20% of the solids by weight of (i) and (ii), wherein the polyisocyanate is selected from the group consisting of biurets, isocyanurates and allophonates of hexamethylene diisocyanate and wherein the polyisocyanate has an average isocyanate functionality of less than 4.0, and
      (iii) one or more vinyl monomers inert to isocyanate functionality, and
   (b) reacting 0 to 100% of the isocyanate groups of the urethane prepolymer (i) and polyisocyanate (ii) in blend (a) with a monofunctional active hydrogen containing vinyl monomer, and
   (c) dispersing (b) into water,
   (d) chain extending residual isocyanate groups of the prepolymer with one or more active hydrogen containing compounds, and
   (e) reacting the vinyl groups of the blend by free radical polymerization.

* * * * *